United States Patent [19]

Uchida et al.

[11] Patent Number: 4,844,126
[45] Date of Patent: Jul. 4, 1989

[54] ROTARY CONTROL VALVE FOR POWER ASSIST STEERING SYSTEM

[75] Inventors: Koh Uchida, Sagamihara; Takashi Kurihara, Atsugi; Makato Miyoshi, Kawasaki, all of Japan

[73] Assignee: Nissan Motor Co., Ltd., Yokohama, Japan

[21] Appl. No.: 150,949

[22] Filed: Feb. 1, 1988

[30] Foreign Application Priority Data

Jan. 30, 1987 [JP] Japan .................................. 62-19784

[51] Int. Cl.$^4$ .............................................. F15B 13/04
[52] U.S. Cl. ................... 137/625.21; 91/375 R
[58] Field of Search ............... 137/625.21, 625.22, 137/625.23, 625.24; 91/375 A, 375 R; 180/149

[56] References Cited

U.S. PATENT DOCUMENTS

| | | | |
|---|---|---|---|
| 4,440,254 | 4/1984 | Shibahata et al. | 180/140 |
| 4,441,572 | 4/1984 | Ito et al. | 180/140 |
| 4,465,098 | 8/1984 | Bacardit | 137/625.21 |
| 4,465,099 | 8/1984 | Kervagoset | 137/625.24 X |
| 4,512,238 | 4/1985 | Bacardit | 91/370 |
| 4,561,516 | 12/1985 | Bishop et al. | 180/142 |
| 4,561,521 | 12/1985 | Duffy | 180/142 |
| 4,565,115 | 1/1986 | Bacardit | 91/375 A |
| 4,570,735 | 2/1986 | Duffy | 180/142 |
| 4,579,186 | 4/1986 | Uno et al. | 180/140 |
| 4,586,581 | 5/1986 | Shibahata et al. | 180/140 |
| 4,588,039 | 5/1986 | Uno et al. | 180/140 |
| 4,619,339 | 10/1986 | Futaba et al. | 180/143 |
| 4,632,204 | 12/1986 | Honaga et al. | 180/142 |
| 4,640,379 | 2/1987 | Shibahata et al. | 180/140 |
| 4,672,885 | 6/1987 | Kervagoret | 91/450 |

FOREIGN PATENT DOCUMENTS

| | | |
|---|---|---|
| 2353068 | 5/1974 | Fed. Rep. of Germany . |
| 2568843 | 2/1986 | France . |
| 47-30039 | 11/1972 | Japan . |
| 54-15232 | 2/1979 | Japan . |
| 54-159921 | 12/1979 | Japan . |
| 56-38430 | 9/1981 | Japan . |
| 56-174363 | 12/1981 | Japan . |
| 57-30663 | 2/1982 | Japan . |
| 58-156459 | 9/1983 | Japan . |
| 60-85061 | 5/1985 | Japan . |
| 61-43229 | 9/1986 | Japan . |

Primary Examiner—Alan Cohan
Attorney, Agent, or Firm—Foley & Lardner, Schwartz, Jeffery, Schwaab, Mack, Blumenthal & Evans

[57] ABSTRACT

A rotary type power steering control valve comprises a groove arrangement which includes two first grooves spaced longitudinally along a longitudinal axis, and a second longtudinally extending groove which has one circumferential side overlapping the two first grooves to define two variable flow orifices. The direction of fluid is reversed by the second longitudinally extending groove so that both of the variable flow orifices are arranged in series.

3 Claims, 7 Drawing Sheets

FIG.12
FIG.10
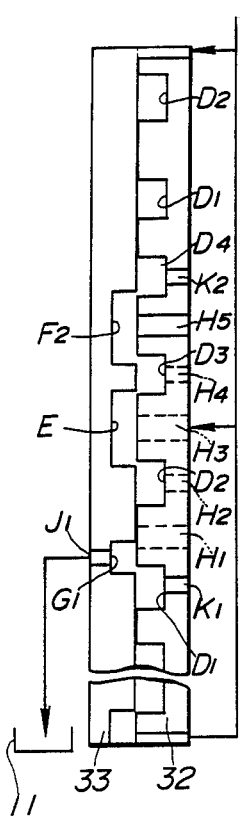
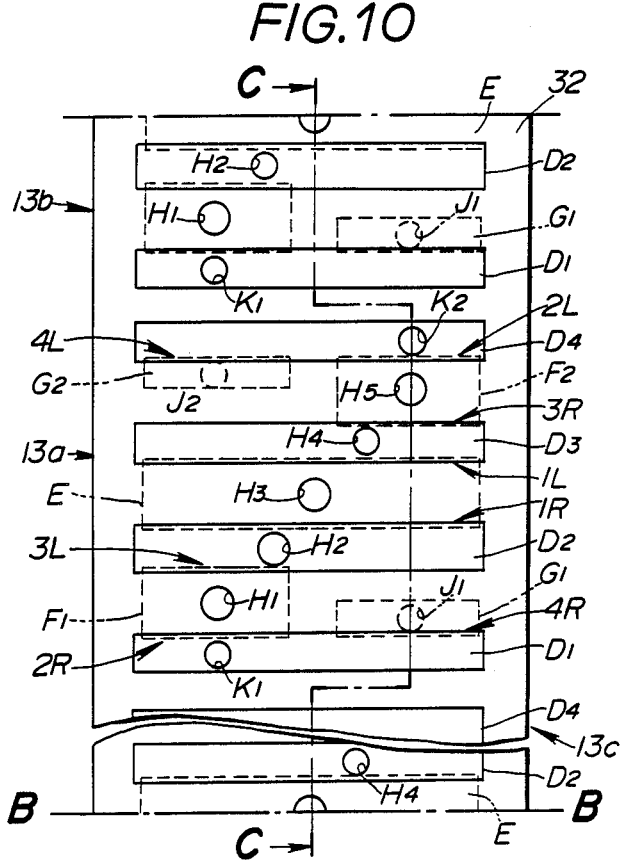
FIG.11
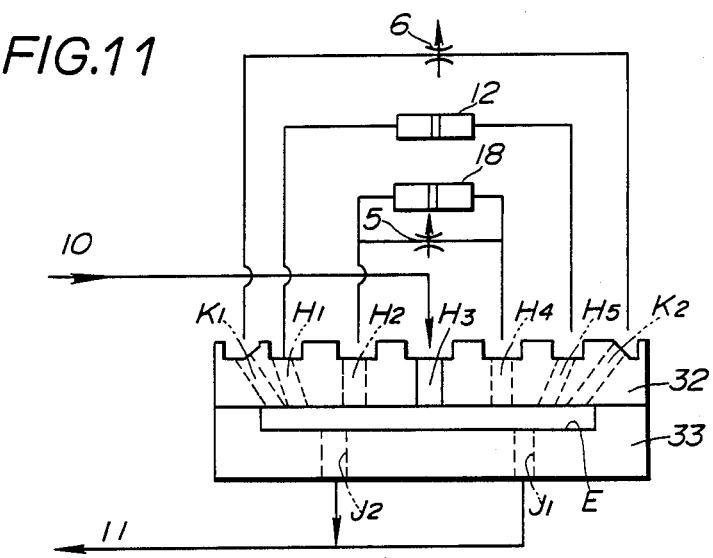

ROTARY CONTROL VALVE FOR POWER ASSIST STEERING SYSTEM

RELATED APPLICATIONS

The following two U.S. Pat. Applications have been already filed and assigned to the same assignee of the present application.

(1) U.S. Pat. application Ser. No. 044,065, filed on April 29, 1987, now pending, (Our Ref.: UO40-87).

The following five U.S. Pat. applications have been concurrently filed on Dec. 28, 1987 and assigned to the same assignee of the present application.

(3) U.S. Pat.application Ser. No. 138,480, claiming priority based on Japanese Patent Application No. 61-313519 with a filing date of Dec. 27, 1986, (our ref.: UO97-87).

(4) U.S. Pat. application Ser. No. 138,490, claiming priority based on Japanese Patent Application No. 61-313521 with a filing date of Dec. 27, 1986, (our ref.: UO98-87).

(5) U.S. Pat. application Ser. No. 138,479, claiming priority based on Japanese Patent Application No. 61-313518 with a filing date of Dec. 27, 1986, (our ref.: UO99-87).

(6) U.S. Pat. application Ser. No. 138,402, claiming priority based on Japanese Patent Application No. 61-313520 with a filing date of December 27, 1986, (our ref.: U100-87).

(7) U.S. Pat. application Ser. No. 138,345, claiming priority based on Japanese Patent Application No. 61-313517 with a filing date of Dec. 27, 1986, (our ref.: U101-87).

The following three U.S. Pat. applications have been concurrently filed and assigned to the same assignee of the present application.

(8) U.S. Pat. Application Ser. No. 151,127 (filed February 1, 1988), claiming priority based on Japanese Patent Application No. 62-19787 with a filing date of Jan. 30, 1987, (our ref.: U102-87).

(9) U.S. Pat. application Ser. No. 151,121 (filed Feb. 1, 1988) claiming priority based on Japanese Patent Application No. 62-19783 with a filing date of Jan. 30, 1987, (our ref.: U133-87).

(10) U.S. Pat. Application Ser. No. 151,122 (filed Feb. 1, 1988) claiming priority based on Japanese Patent Applications No. 62-19785 with a filing date of Jan. 30, 1987 amd No. 62-19786 with a filing date of Jan. 30, 1987, (our ref.: U134-87).

DETAILED DESCRIPTION OF THE INVENTION

The present invention relates to a rotary type power steering control valve for use with a power assist steering system.

Japanese Utility Model Application No. 55-72876 which was laid open on Dec. 23, 1981 under the publication No. 56-174363 discloses a rotary type power steering control valve which has an inner valve formed with a plurality of grooves which cooperate with a plurality of inner grooves to form a fluid flow distributor circuit producing a pressure difference in a power cylinder in response to turning of a steering wheel. According to the groove arrangement formed between the inner valve and the surrounding sleeve, the fluid under pressure supplied thereto is evenly distributed into two circumferetnial opposed flows toward circumferentiall spaced two fluid return ports when the steering wheel is in the central rest position. If it is desired to increase the number of variable flow orifices provided in two parallel fluid paths of a fluid flow distributor circuit using the teaching of this publication, the number of grooves formed between the circumferential area defined by two fluid return ports have to arranged one after another in the circumferential direction. This however poses a problem that the machining of the grooves become difficult and another problem that the width of each groove and the width of each land separating the adjacent grooves become narrow, which makes it to difficult to machine connection holes, each with a sufficiently large diameter.

An object of the present invention is to provide a rotary type power steering control valve which is free of the above-mentioned problems.

SUMMARY OF THE PRESENT INVENTION

According to the present invention, a rotary type power steering control valve is formed with longitudinally extending groove means for reversing the direction of fluid flow.

More specifcally, the groove means indlude two grooves which define boundaries between which a plurality of variable flow orifice defining grooves are arranged. Each of the boundary defining grooves overlap with a plurality of grooves to define a plurality of variable flow orifices on one side thereof so as to receive fluid from one of the mating grooves and allow the fluid to flow into another mating groove.

BRIEF DESCRIPTION OF THE DRAWINGS

FIG. 10 is a diagram developed according to a longitudinal section V—V of FIG. 9;

FIG. 11 is a section along the line B—B of FIG. 10;

FIG. 12 is a section along the line C—C of FIG. 10;

Figure 1:
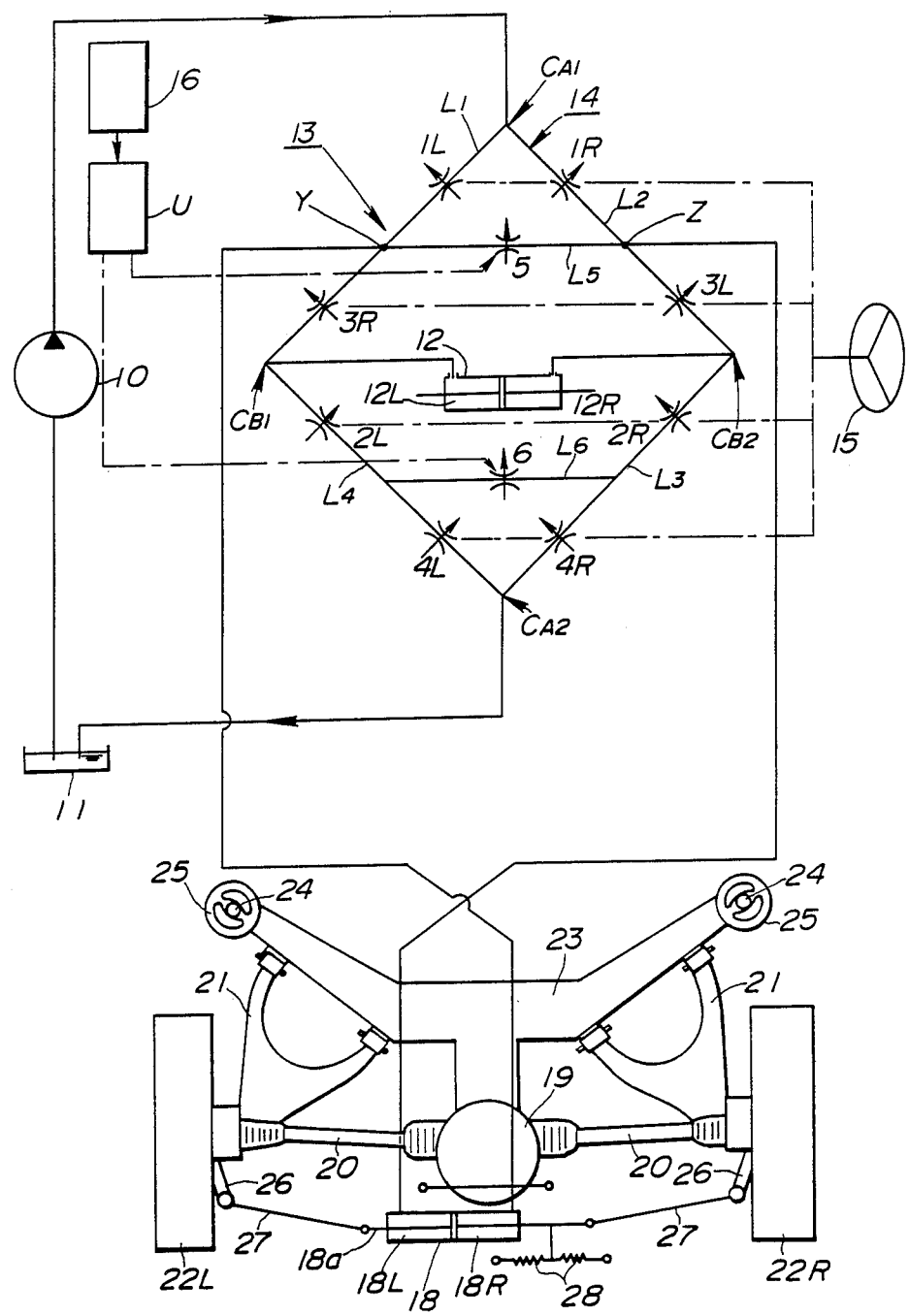
FIG. 1 is a circuit diagram of a hydraulic fluid pressure control system in association with a front power cylinder of a power assist steering system for a pair of dirigible front wheels of a vehicle and a rear power cylinder for a pair of rear wheel of the vehicle.
Figure 14:
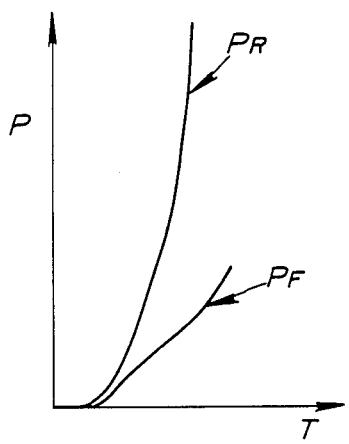
Figure 15:
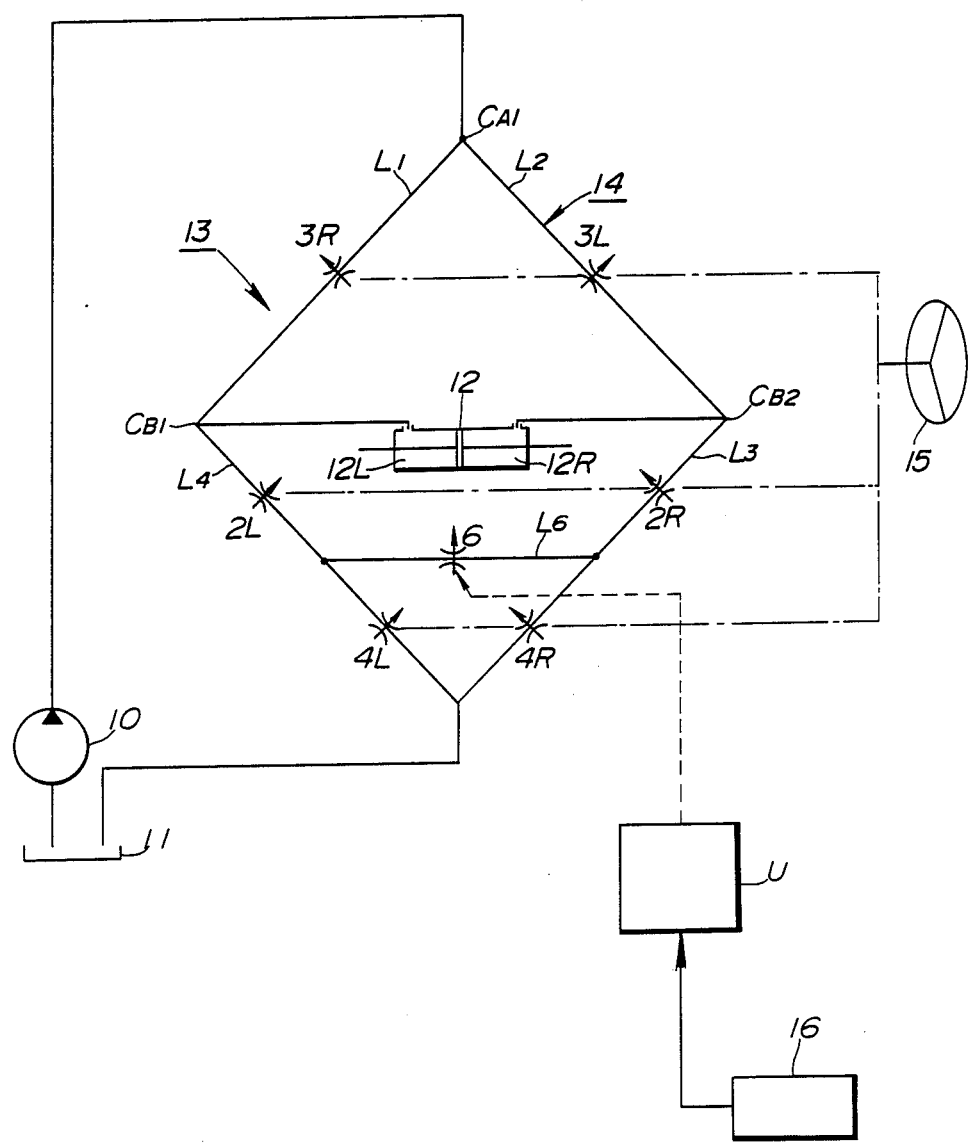
Figure 16:
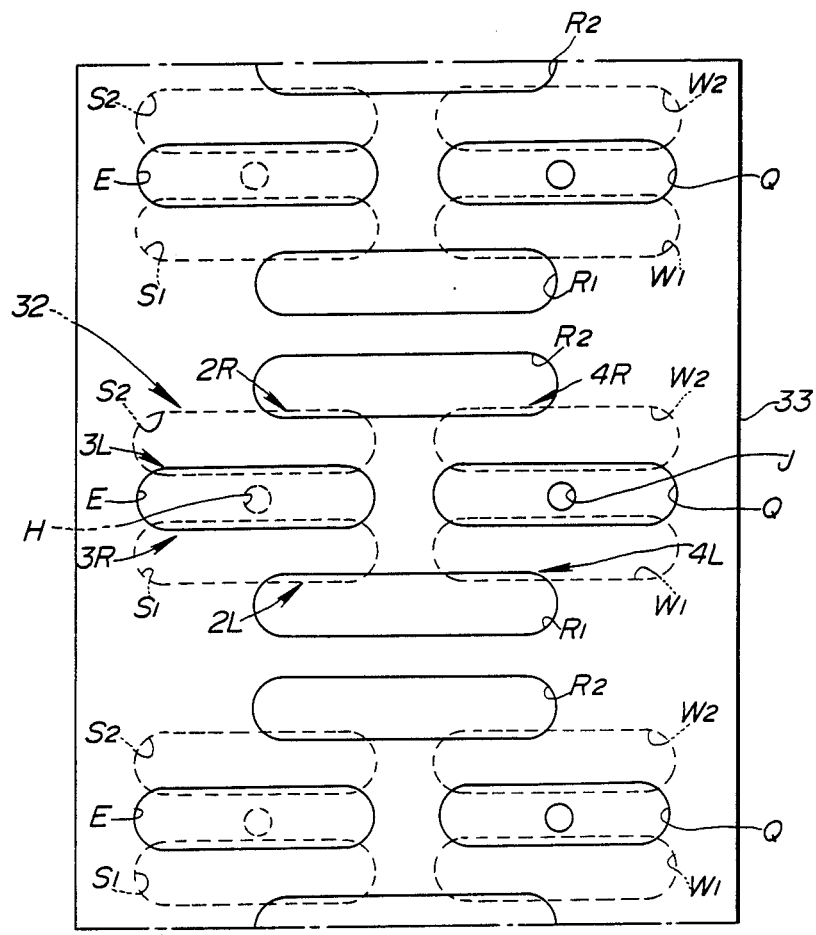

(12) varies versus steering torque (T) at zero vehicle speed;

FIG. 14 shows a curve $P_R$ illustrating how a second pressure difference applied to a rear power cylinder (18) varies versus steering torque (T) at high vehicle speeds in comparison with the curve $P_F$;

FIG. 15 is a similar view to FIG. 1 illustrating a fluid flow distributor circuit employed by a second embodiment of a rotary type control valve shown partly in FIG. 16; and FIG. 16 is a similar view to FIG. 10 illustrating the feature of the second embodiment.

DETAILED DESCRIPTION OF THE INVENTION

Referring to FIG. 1, a hydraulic fluid pressure control system is shown in operative connection with a front power cylinder 12, as a first hydraulic fluid pressure operated device, of a power assist steering system for a pair of front directable wheels and a rear power cylinder, as a second hydraulic fluid pressure operated device, of a rear wheel steering system 17.

The control system includes an oil pump 10, as a hydraulic fluid source, a tank 11, as a fluid reservoir, and a power steering control valve 13 employing a fluid flow distributor circuit 14 of the open center type. Also shown are a steering wheel 15, a vehicle speed sensor 16 and a control unit U.

Figure 3:
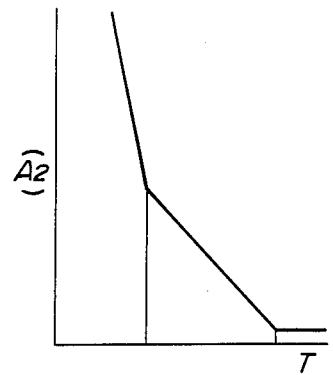
FIG. 3 shows a second pattern in which an orifice flow area ($A_2$) of an outflow control variable flow orifice (2R or 2L) decreases as steering torque (T) increases.
Figure 4:
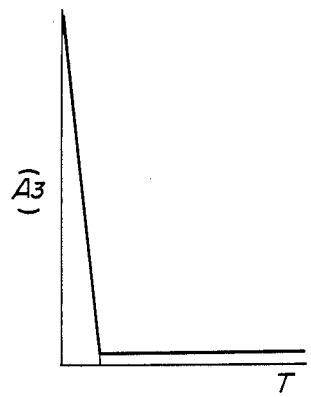
FIG. 4 is a third pattern in which an orifice flow area ($A_3$) of an inflow control variable flow orifice (3R or 3L) decreases as steering torque (T) increases.
Figure 5:
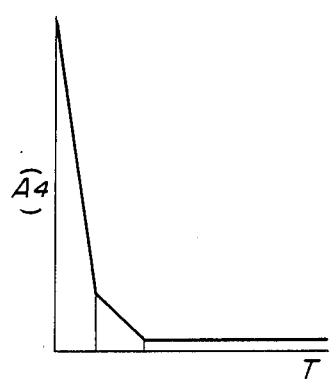
FIG. 5 is a fourth pattern in which an orifice flow area ($A_4$) of an outflow control variable flow orifice (4R or 4L) decreases as steering torque (T) increases.

In the conventional manner, the fluid flow distributor circuit 14 includes two parallel fluid flow paths, namely, a first fluid flow path $L_1$-$L_4$ and a second fluid flow path $L_2$-$L_3$, connected between a pump fluid supply port $C_{A1}$ and a fluid return port $C_{A2}$. The first fluid flow path $L_1$-$L_4$ has a cylinder connection port $C_{B1}$ connected to a left turn cylinder chamber 12L of the front power cylinder 12, while the second fluid flow path $L_2$-$L_3$ has a cylinder connection port $C_{B2}$ connected to a right turn cylinder chamber 12R of the power cylinder 12. Thus, the first fluid flow path may be divided into an upstream flow path section $L_1$ and a downstream flow path section $L_4$ with regard to the cylinder connection port $C_{B1}$. Similarly, the second fluid flow path may be divided into an upstream flow path section $L_2$ and a downstream flow path section $L_3$ with regard to the cylinder connection port $C_{B2}$. The first fluid flow path $L_1$-$L_4$ includes an inflow control variable flow orifice 3R of the first kind which has an orifice area $A_3$ decreasing as input torque T increases when the steering wheel 15 is turned clockwise from a central rest position so as to restrict fluid flow into the left turn cylinder chamber 12L of the power cylinder 12, and two series outflow control variable flow orifices 2L and 4L of the second kind which have orifice areas $A_2$ and $A_4$ decreasing as steering torque T increases when the steering wheel 15 is turned counterclockwise from the central rest position so as to restrict fluid flow out of the left turn cylinder chamber 12L of the power cylinder 12. The second fluid flow path $L_2$-$L_3$ includes an inflow control variable flow orifice 3L of the second kind which has an orifice area $A_3$ decreasing as the steering torque T increases when the steering wheel 15 is turned counterclockwise from the central rest position so as to restrict fluid flow into the right turn cylinder chamber 12R of the power cylinder 12, and two series outflow control variable flow orifices 2R and 4R of the second kind which have orifice areas $A_2$ and $A_4$ decreasing as the steering torque T increases when the steering wheel 15 is turned clockwise from the central rest position so as to restrict fluid flow out of the right turn cylinder chamber 12R of the power cylinder 12. The orifice area $A_3$ of the inflow control variable flow orifice 3R of the first kind decreases in the pattern as shown in FIG. 4 during clockwise turning of the steering wheel 15, while the orifice areas $A_2$ and $A_4$ of the outflow control variable flow orifices 2R and 4R of the first kind decrease in the patterns as shown in FIGS. 3 and 5 during clockwise turning of the steering wheel 15. The orifice area $A_3$ of the inflow control variable flow orifice 3L of the second kind decreases in the pattern as shown in FIG. 4 during counterclockwise turning of the steering wheel 15, while the orifice areas $A_2$ and $A_4$ of the outflow control variable flow orifices 2L and 4L of the second kind decrease in the patterns as shown in FIGS. 3 and 5 during counterclockwise turning of the steering wheel 15.

Figure 2:
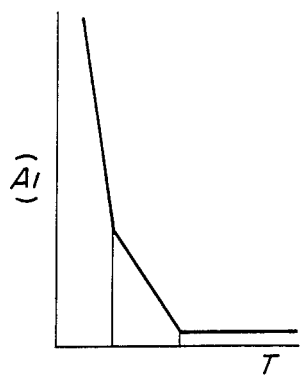
FIG. 2 shows a first pattern in which an orifice flow area ($A_1$) of a variable flow orifice (1L or 1R) decreases as a steering torque (T) increases.
Figure 6:
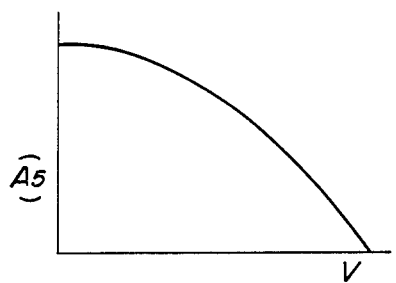
FIG. 6 is a pattern in which an orifice area ($A_5$) of a first externally controlled variable flow orifice (5) varies as vehicle speed (V) varies.
Figure 7:
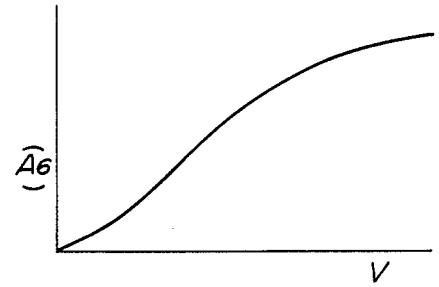
FIG. 7 is a pattern in which an orifice area ($A_6$) of a second externally controlled variable flow orifice (6) varies as vehicle speed (V) varies.
Figure 8:
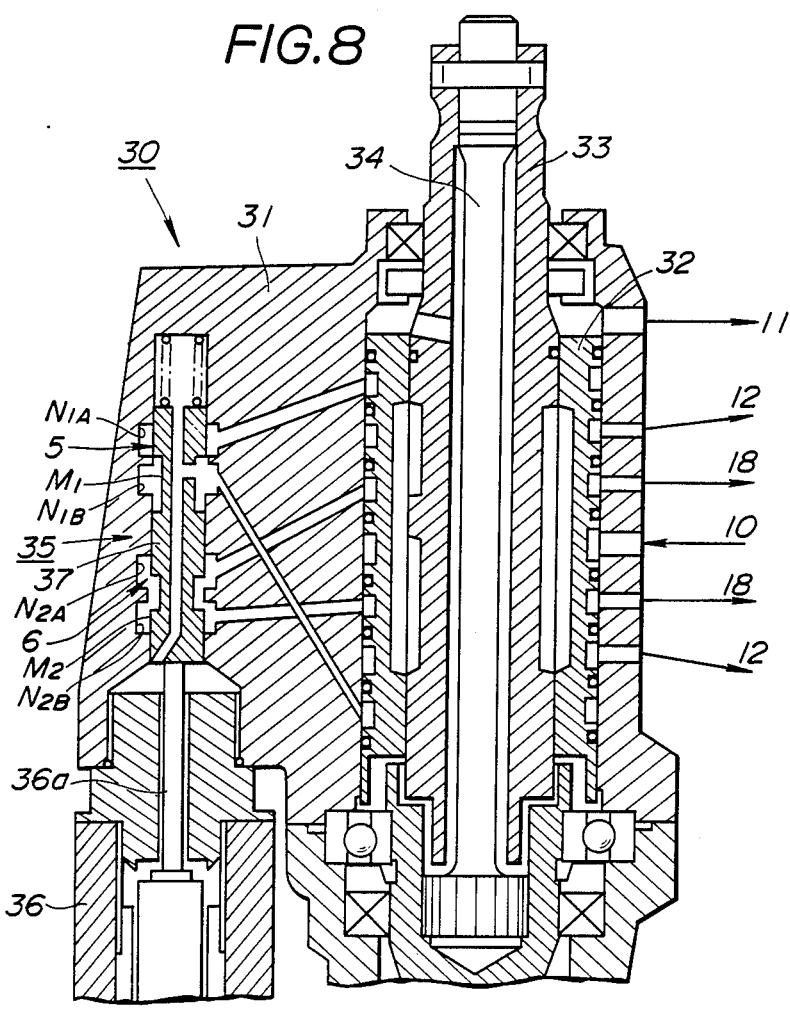
FIG. 8 is a fragmentary sectional diagram of a first embodiment of a rotary type control valve employing a fluid flow distributor circuit shown in FIG. 1.
Figure 9:
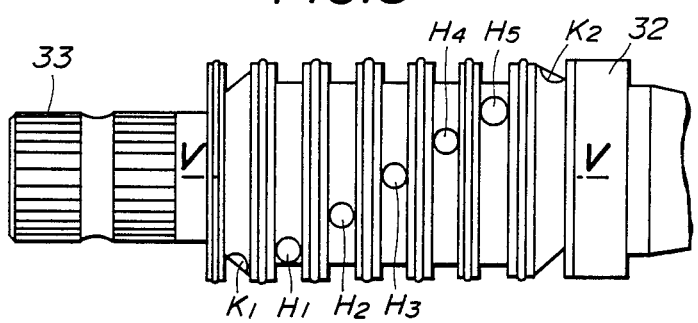
FIG. 9 is a perspective view of an inner valve of the control valve shown in FIG. 8.

In order to produce a second pressure difference in the rear power cylinder 18, there are provided two auxiliary variable flow orifices, namely, a first auxiliary variable flow orifice 1R of the first kind which has an orifice area $A_1$ decreasing as steering torque T increases when the steering 15 is turned clockwise from the central rest position, and a second auxiliary variable flow orifice 1L of the second kind which has an orifice area $A_1$ decreasing as steering torque T increases when the steering wheel 15 is turned counterclockwise from the central rest position. The first auxiliary variable flow orifice 1R is arranged in the second fluid flow path $L_2$-$L_3$ at the upstream section $L_2$ thereof and in series with the inflow control variable flow orifice 3L. The second auxiliary variable flow orifice 1L is arranged in the first fluid flow path $L_1$-$L_4$ at the upstream section $L_1$ thereof and in series with the inflow control variable flow orifice 3R. Specifically, the first and second auxiliary variable flow orifices 1R and 1L are disposed upstream of the inflow control variable flow orifices 3L and 3R, respectively. The orifice area $A_1$ of the first auxiliary variable flow orifice 1R decreases in the pattern as shown in FIG. 2 during clockwise turning of the steering wheel 15, while the orifice area $A_1$ of the second auxiliary variable flow orifice 1L decreases in the pattern as shown in FIG. 2 during counterclockwise turning of the steering wheel 15. The control valve 13 also includes a first externally controlled variable flow orifice 5 arranged in a second bypass path $L_6$. The first bypass path $L_5$ is arranged to bypass the first and second auxiliary variable flow orifices 1R and 1L, while the second bypass path $L_6$ is arranged to bypass the outflow control variable flow orifices 4R and 4L. These externally controlled variable orifices 5 and 6 are controlled by the control unit U in response to a vehicle speed V detected by the vehicle speed sensor 16. The control unit U regulates electric current supplied to a solenoid operated valve, not shown, which defines and varies the flow areas $A_5$ and $A_6$ of the externally controlled variable orifices 5 and 6 in response to the output of the vehicle speed sensor 16. The flow area $A_5$ of the externally controlled variable flow orifice 5 is maximum at zero or near zero vehicle speeds and varies in inverse proportional to vehicle speed V in the pattern as shown in FIG. 6. Thus, the externally controlled variable flow orifices 5 is fully closed at high vehicle speeds. The flow area $A_6$ of the second externally controlled variable flow orifice 6 is zero at zero vehicle speed and varies in proportional to vehicle speed V in the pattern as shown in FIG. 7.

The first fluid flow path $L_1$-$L_4$ includes a first predetermined portion Y connected to a right turn cylinder chamber 18R of the rear power cylinder 18. The first predetermined portion Y is disposed downstream of the second auxiliary variable flow orifice 1L, but upstream of the inflow control variable flow orifice 3R of the first kind. The second fluid flow path $L_2$-$L_3$ includes a second predetermined portion Z connected to a left turn cylinder chamber 18L of the rear power cylinder 18. The second predetermined portion Z is disposed downstream of the first auxiliary variable flow orifice 1R, but upstream of the inflow control variable flow orifice 3L of the second kind.

The rear power cylinder 18 includes a piston rod 18a which has one end operatively connected to a knuckle arm 26 of a rear left steering wheel 22L via a rod 27 and an opposite end operatively connected to a knuckle arm 26 of a right rear wheel 22R via a rod 27. In order to keep the rear wheels 22L and 22R in their neutral position, return springs or rubber bushings 28 are provided. The rear wheels 22L and 22R are suspended via semi-trailing arms 21 to a rear wheel support member 23 which is in turn mounted to a vehicle body, not shown, via pins 24 and rubber insulators 25 in the conventional manner. Designated by the reference numeral 19 is a differential gearing which has axles 20 extending to the rear wheels 22L and 22R in the conventional manner.

Referring to FIG. 1, the operation of the fluid flow distributor circuit 14 is explained. Let us assume that the vehicle is at a standstill and the steering wheel 15 is in the central rest position. Under these circumstances, all of the variable flow orifices 1L, 3R, 2L and 4L disposed in the first fluid flow path $L_1$-$L_4$ are opened to allow unrestricted fluid flow, and all of the variable flow orifices 1R, 3L, 2R and 4R of the second fluid flow path $L_2$-$L_3$ are opened to allow unrestricted fluid flow. Besides, the first externally controlled variable flow orifice 5 is opened to allow unrestricted fluid flow through the bypass path $L_5$ since the vehicle speed V detected by the vehicle speed sensor 16 is at zero. The second externally controlled variable flow orifice 6 is closed and thus the bypass path $L_6$ is closed. Under these conditions, the fluid under pressure from the pump 10 is divided evenly through the first fluid path $L_1$-$L_4$ in one direction and through the second fluid flow path $L_2$-$L_3$ in the opposite directions. Thus, there occur no pressure acting on the front power cylinder 12 and the rear power cylinder 18.

In the central rest position of the steering wheel 15, let us assume that the first externally controlled variable flow orifice 5 is fully closed and the second externally controlled variable flow orifice 6 is fully opened in response to a high vehicle speed. Under these conditions also, the fluid under pressure from the pump 10 is divided evenly through the first fluid flow path $L_1$-$L_4$ in one direction and through the second fluid flow path $L_2$-$L_3$ in the opposite direction. Thus, no pressure acts on the front power cylinder 12 and the rear power cylinder 18.

Figure 13:
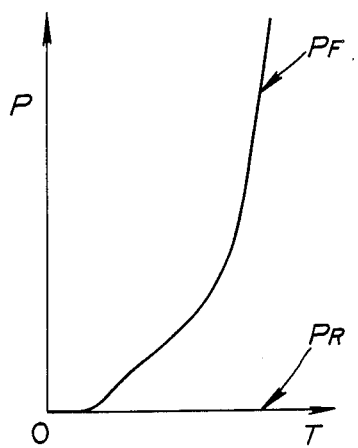
FIG. 13 shows a curve $P_F$ illustrating how a first pressure difference applied to a front power cylinder

In turning the steering wheel 15 clockwise from the central rest position at zero vehicle speed, the inflow control variable flow orifice 3R decreases its flow area $A_3$ in response to steering torque T in the pattern as shown in FIG. 4, the outflow control variable flow orifices 2R and 4R decrease their flow areas $A_2$ and $A_4$ in response to steering torque T in the patterns as shown in FIGS. 3 and 4, and the auxiliary variable flow orifice 1R decreases its flow area $A_1$ in response to steering torque T in the pattern as shown in FIG. 2, even though the variable flow orifices 1L, 2L, 3L and 4L are opened. Under these conditions, since the auxiliary variable flow orifice 1R is bypassed via the first externally controlled variable flow orifice 5, the variable flow orifices 3, 2R and 4R only effect a throttling of the fluid path inducing a pressure drop which in turn results in a pressure increase in the right turn cylinder chamber 12R of the front power cylinder 12 and in the both cylinder chambers 18R and 18L of the rear power cylinder 18. The variable flow orifices 2L and 4L are opened and thus the left turn cylinder pressure chamber 12L of the front power cylinder 12 is in substantially in direct communication with the reservoir 11. Thus, there is created pressure difference $P_F$ between the right turn cylinder chamber 12R and the left turn cylinder chamber 12L, causing the rod of the power cylinder to displace toward the left as viewed in FIG. 1. Since the same pressure as that supplied to the right turn cylinder chamber 12R is supplied also to the right turn and left turn cylinder chambers 18R and 18L of the rear power cylinder 18, there occurs substantially no pressure difference. Thus, the pressure difference $P_R$ in the rear power cylinder 18 is substantially zero. As shown in FIG. 13, the pressure difference $P_F$ varies in proportion to steering torque T in a variation pattern which reflects the result of combination of the patterns as shown in FIGS. 3 and 5, since the inflow control variable orifice 3R is substantially closed at small steering torque as shown in FIG. 4. The pressure difference $P_R$ is substantially zero regardless of the variation of steering torque T. Thus, the power assist to the front steering linkage increases as shown by the curve $P_F$ in FIG. 13.

Let us now consider how the fluid flow distributor circuit 14 works at high vehicle speed. In this case, the first externally controlled variable flow orifice 5 is fully closed, while the second externally controlled variable flow orifice 6 is fully opened. In turning the steering wheel 15 clockwise, the outflow control variable flow orifices 2L are opened and thus the left turn cylinder chamber 12L is in substantially direct communication with the reseroir 11, whereas the inflow control variable flow orifice 3R and the auxiliary variable flow orifice 1R are restricted and effect a throttling of the fluid path, inducing a pressure drop which in turn results in a pressure increase in the right turn cylinder chamber 18R of the rear power cylinder 18. In this case, since the outflow control variable flow orifice 4R is bypassed via the second externally controlled variable flow orifice 6, only the outflow control variable flow orifice 2R effects a throttling of the fluid path, inducing a pressure drop which results in a pressure increase in the right turn cylinder chamber 12R of the power cylinder 12 and the left turn cylinder chamber 18L of the rear power cylinder 18. With the same steering torque T, the pressure increase in the right turn cylinder chamber 12R of the front power cylinder 12 is less than the pressure increase created at zero vehicle speed due to the effect of the pressure drop induced by the throttling effected by the auxiliary variable flow orifice 1R and also due to the fact the outflow variable flow orifice 4R is bypassed. Besides, since the auxiliary variable flow orifice 1R is substantially closed at a relatively small steering torque T as compared to the outflow control variable flow orifice 2R is closed (see FIGS. 2 and 3), the power assist produced by the power cylinder 12 is less and suppressed to a low level as will be understood from the curve $P_F$ in FIG. 14. On the contrary, the pressure increase in the right turn cylinder chamber 18R varies in a pattern reflecting the pattern as shown in FIG. 2 in response to steering torque T. Since the pressure increase in the left turn cylinder chamber 18L of the rear power cylinder 18 is small and limited, the pressure difference $P_R$ in the rear power cylinder 18 increases rapidly as the steering torque T increases as shown in FIG. 14, causing the rod 18a to displace to the left as viewed in FIG. 1, turning the rear wheels 22L and 22R to the right.

Referring to FIGS. 8 to 11, a first embodiment of a rotary type control valve 30 according to the present invention is described. This rotary valve 30 is of the conventional type including, within a valve housing 31, a valve sleeve 32, a rotary inner valve 33 and a torsion bar 34. The rotary valve 30 include control valve portions 13a, 13b and 13c arranged circumferentially one after another. Each control valve is substantially the same as the control valve 13 described in connection mainly with FIG. 1.

FIGS. 10-12 show the relative position of the inner valve 33 with regard to the outer valve sleeve 32 when the rotary valve 30 in in the central rest position. In order to form the fluid flow distributor circuit of each of the control valve portions 13a, 13b and 13c, four longitudinally extending blind ended inner grooves $D_1$, $D_2$, $D_3$ and $D_4$ are formed in the inner wall of the valve sleeve 32 surrounding the inner valve 33. These inner grooves are circumferentially separated by lands and may be divided into two groups, one consisting of two grooves $D_2$ and $D_3$ which may be called as central grooves, the other consisting of two grooves $D_1$ and $D_4$ disposed on the circumferentially outer sides of the central grooves $D_2$ and $D_3$ and may be called as boundary grooves. As will be understood as the description proceeds further, the fluid flow distributor circuit of each of the control valve portions 13a, 13b and 13c formed between the boundary grooves $D_1$ and $D_4$. Owing to this circuit arrangement, the valve portions 13a, 13b and 13c can be positioned closely enough to allow sufficiently wide circumferential area for each of the control valve portions 13a, 13b and 13c.

The two central grooves $D_2$ and $D_3$ are spaced by a land which is wide enough to allow drilling of a pump fluid supply port $H_3$ of a sufficiently large diameter. The pump fluid supply port $H_3$ is connected to a pump 10 (see FIG. 11). The bottom wall of each of the central grooves $D_2$ and $D_3$ is wide enough to allow drilling of a cylinder connection hole $H_2$ or $H_4$. The cylinder connection hole $H_2$ formed through the bottom wall of the central groove $D_2$ is connected to a left turn cylinder chamber 18L of a rear power cylinder 18, while the cylinder connection hole $H_4$ formed through the bottom wall of the other central groove $D_3$ is connected to a right turn cylinder 18R of the rear power cylinder 18. These holes $H_2$ and $H_4$ are connected to each other via a first externally controlled variable flow orifice 5. Formed through the land separating the grooves $D_2$ and $D_1$ is a cylinder connection hole $H_1$ which is connected to a right turn cylinder chamber 12R of a front power cylinder 12, while formed through the land separating the grooves $D_3$ and $D_4$ is a cylinder connection hole $H_5$ which is connected to a left turn cylinder chamber 12L of the front power cylinder 12. Formed through the bottom wall of the boundary groove $D_1$ is a hole $K_1$, while formed through the bottom wall of the other boundary groove $D_4$ is a hole $K_2$. These holes $K_1$ and $K_2$ are connected to each other via a second externally controlled variable flow orifice 6.

Formed in the outer peripheral wall of the inner valve 33 is a longitudinally extending blind ended central groove E which is in direct communication with the pump fluid supply hole $H_3$ and overlaps the main grooves $D_2$ and $D_3$ to define a variable flow orifice 1R and a variable flow orifice 1L. A set of grooves $F_1$ and $G_1$ are formed in the outer peripheral wall of the inner valve 33, while another set of grooves $F_2$ and $G_2$ are formed therein. The groove $F_1$ is in direct communication with the cylinder connection hole $H_1$ and overlaps the adjacent grooves $D_2$ and $D_1$ to define variable flow orifices 3L and 2R. The groove $G_1$ is longitudinally separated from the adjacent groove $F_1$ and overlaps the groove $D_1$ to define a variable flow orifice 4R. Formed through the bottom wall of the groove $G_1$ is a fluid return hole $J_1$ connected to a fluid reservoir 11. On the other hand, the groove $F_2$ is in direct communication with the cylinder connection hole $H_5$ and overlaps the adjacent grooves $D_3$ and $D_4$ to define variable flow orifices 3R and 2L. The groove $G_2$ is longitudinally separated from the adjacent groove $F_2$ and overlaps the groove $D_4$ to define a variable flow orifice 4L. Formed through the bottom wall of the groovew $G_2$ is a fluid return hole $J_2$ connected to the fluid reservoir 11.

In the central rest position of the rotary valve 30 as shown in FIGS. 10 and 12, the fluid supplied to the central groove E via the pump fluid supply hole $II_3$ is evenly divided into two flows. As viewed in FIG. 10, one flow firstly directed upward via the variable flow orifices 1L, 3R and 2L passing through the inner groove $D_3$ until the fluid reaches the boundary groove $D_4$ where it changes its direction to the left and then downward to enter the groove $G_2$ via the variable flow orifice 4L to pass into the fluid return hole $J_2$. The other flow firstly directed downward via the variable flow orifices 1R, 3L and 2R passing through the inner groove $D_2$ until the fluid reaches the other boundary groove $D_4$ where it changes its direction to the right and then upward to enter the groove $G_1$ via the variable flow orifice 4R to pass into the fluid return hole $J_1$.

From this description, it will now be appreciated that the boundary grooves $D_1$ and $D_4$ prohibits define a boundary within which the fluid flow distributor of each of the control valves 30a, 30b and 30c is confined. It will also be noted that, the flow of fluid is forced to change its direction by the one of the boundary grooves $D_1$ and $D_4$.

Referring back to FIG. 8, the valve housing 31 is integrally formed with a solenoid operated externally controllable variable orifice valve 35. This valve 35 includes a spool 37 which is activated by a plunger 36a of a solenoid 36. The outer peripheral wall of the spool 37 is formed with grooves $M_1$ and $M_3$. The groove $M_1$ cooperates with inner grooves $M_{1A}$ and $M_{1B}$ formed in the inner wall of the spool receiving bore to define the first variable flow orifice 5. The other groove $M_2$ cooperates with grooves $M_{2A}$ and $M_{2B}$ to define the second variable flow orifice 6.

Referring next to FIGS. 15 and 16, a second embodiment is briefly described. The fluid flow distributor circuit shown in FIG. 15 results from removing from the circuit shown in FIG. 1 the auxiliary variable flow orifices 1R, 1L and the first externally controlled variable flow orifice 5 which are related to the rear wheel steering control system. The similar reference numerals as used in FIG. 1 are used to designate similar parts in FIG. 15.

FIG. 16 shows in fully drawn line an arrangement of grooves formed in the outer periphral wall of an inner valve 33. Shown by broken lines are inner grooves formed in the inner wall of a surrounding valve sleeve 32. As different from the first embodiment, so-called boundary grooves $R_1$ and $R_2$ are formed in the outer peripheral wall of the inner valve 33. Also formed in the outer peripheral wall of the inner valve 33, for each flow distributor circuit, are a central groove E in fluid communication with a pump fluid supply port H formed through the surrounding valve sleeve, and a drain groove Q formed with a fluid return port J. Formed in the inner wall of the valve sleeve 33 are two circumferentially spaced grooves $S_1$ and $S_2$, and two circumferentially spaced grooves $W_1$ and $W_2$ which are longitudinally separated from the grooves $S_1$ and $S_2$, respectively. The groove $S_1$ overlaps the central groove E on one hand and the boundary groove $R_1$ on the other hand to define an inflow control variable orifice 3R and an outflow control variable flow orifice 2L. The groove $W_1$ overlaps the boundary groove $R_1$ to define an outflow control variable flow orifice 4L and overlaps the drain groove Q. The degree of the overlapping between the grooves $W_1$ and Q will not define any flow restrictor. Similarly, the groove $S_2$ overlaps the central groove E on one hand and the boundary groove $R_2$ on the other hand to define an inflow control variable orifice 3L and an outflow control variable flow orifice 2R. The groove $W_2$ overlaps the boundary groove $R_2$ to define an outflow control variable flow orifice 4R and overlaps the drain groove Q. The degree of the overlapping between the grooves $W_2$ and Q will not define any flow restrictor. Although not shown, the grooves $S_1$ and $S_2$ are connected to a power cylinder 12, and the boundary grooves $R_1$ and $R_2$ are connectable via a bypass path $L_6$ provided with a second externally controlled variable flow orifice 6.

What is claimed is:

1. A rotary type power steering control valve comprising relatively displaceable valve elements which are relatively displaceable around a longitudinal axis in response to a steering torque to define a plurality of fluid flow distributor circuits spaced circumferentially one after another, the valve elements being formed with a groove arrangement forming the plurality of fluid flow distributor circuits, wherein said groove arrangement comprises a plurality of first grooves spaced one after another longitudinally along the longitudinal axis, and a longitudinally extending second groove which cooperates with two of said plurality of first grooves to define two variable flow orifices on one of two parallel sides defining said longitudinally extending second groove, wherein said second groove serves as a transfer passage for allowing hydraulic fluid to flow from one of said two variable flow orifices to the other, and said two variable flow orifices are arranged in series with respect to the flow of hydraulic fluid.

2. A rotary type power steering control valve as claimed in claim 1, wherein said longitudinally extending second groove defines a boundary of one of the plurality of fluid flow distributor circuits.

3. A rotary type power steering control valve connected to a pressurized hydraulic fluid source and a fluid reservoir, comprising:
relatively displaceable valve elements which are relatively displaceable along a predetermined imaginary plane in response to a steering torque to define a fluid flow distributor circuit,
said fluid flow distributor circuit including a first branch circuit having an upstream end connected to the pressurized hydraulic fluid source and a downstream end connected to the fluid reservoir, and a second branch circuit having an upstream end connected to the pressurized hydraulic fluid source and a downstream end connected to the fluid reservoir and arranged in parallel to said first branch circuit,
each of said first and second branch circuits including a groove arrangement defined between said relatively displaceable valve elements,
said groove arrangement including a first groove, and a second groove directly connected to the fluid reservoir, said second groove being separated and spaced from said first groove in a direction normal to said predetermined imaginary plane,
said groove arrangement also including a third groove partially overlapping said first and second grooves to define a transfer passage allowing hydraulic fluid to flow from said first groove to said second groove, said third groove defining a first variable flow orifice with said first groove and a second variable flow orifice with said second groove, wherein said first variable and second variable flow orifices are arranged in series between the pressurized hydraulic fluid source and said fluid reservoir.

* * * * *